Patented June 13, 1950

2,511,424

UNITED STATES PATENT OFFICE 2,511,424

CHLORINATED ACRYLIC ESTERS

Vigen K. Babayan, Teaneck, N. J., assignor, by mesne assignments, to Pierce Laboratory, Inc., New York, N. Y., a corporation of New York No Drawing. Application September 15, 1945, Serial No. 616,659

3 Claims. (Cl. 260—89.5)

This invention relates to chlorinated acrylic acid ester polymers, such polymers being hereafter referred to as acrylates.

As is known, polymerized acrylates, for example of molecular weight upwards of about 2,000, constitute more or less plastic or waxy masses, some of which are of rubbery consistency. These materials have a number of industrial uses, but because of the physical consistency, and also for other reasons, the materials are not well suited for certain other purposes requiring a more solid or harder type of resin.

I have found that by extensive chlorination of certain ones of the acrylate polymers, it is possible to alter the physical consistency so as to yield products which are solids, having softening points upwards of 80° C., sometimes even as high as about 175° C., and no longer manifesting the characteristic rubbery or waxy nature of the unchlorinated materials. In view of this striking change in physical consistency, the chlorinated products of the present invention may be employed for various purposes for which, heretofore, certain other materials were used, for example, methacrylate polymers, such as methyl methacrylate.

In addition to the foregoing, the invention is of advantage since the chlorinated products have other improved properties, such as increased solubility in various organic solvents, increased flame- and fire-proofness, increased resistance to attack by other chemicals, and capability of being spread in tough sheets or films which are transparent and substantially colorless, this being in distinct contrast with the same unchlorinated acrylate polymers which, in general, manifest some appreciable opacity.

A typical procedure for producing a product according to the invention is here given for illustrative purposes. The acrylate polymer, for example butyl acrylate, is dissolved in carbon tetrachloride heated close to its boiling point, to give a solution of about 1% concentration. Chlorine gas is then bubbled through the solution in the presence of catalytic light, the temperature being maintained close to the boiling point of the solvent. The bubbling of chlorine is continued until the chlorinated acrylate product contains about 65% combined chlorine, representing an increase in weight in the final product of about 185%. The solution of the chlorinated product in the carbon tetrachloride is then mixed and agitated with methyl alcohol, as the result of which the chlorinated product precipitates as a white powder. The chlorinated butyl acrylate product made in this way has a softening point of about 140° C.

Various factors to be kept in mind in connection with the foregoing are as follows:

First, with reference to the polymers contemplated for use according to this invention, it is noted that the polymeric acrylic acid esters are assumed to have a structural formula such as given just below, in which R represents an alkyl or aryl group of at least 57 molecular weight.

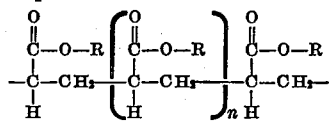

The acrylate radical of the polymer is enclosed in large brackets in the above formula, and this radical or unit is, of course, repeated a multiplicity of times in the molecule, depending upon the molecular weight of the particular polymer. For the present purposes, it is contemplated that the molecular weight of the polymer employed should be at least 2,000 and preferably upwards of 5,000, for instance from 5,000 to 30,000.

An important consideration is that the acrylic acid ester be one having an ester group higher than propyl, i. e., formed with a radical "R" of the molecular weight indicated above, for instance, formed with an alcohol higher than propyl. I have found that chlorination in the manner described above of acrylate polymers having an ester group of the molecular weight of propyl or lower, for instance, esters formed with methyl alcohol or ethyl alcohol, yields only a relatively low combined chlorine content, and further that such chlorinated lower esters of acrylic acid retain more or less of their original rubbery consistency. This is in distinct contrast with the consistency of higher esters, for instance polymeric butyl acrylate which, although having a rubbery consistency prior to chlorination, is converted to a solid upon chlorination, having a melting point even as high as 150° C. Polymeric butyl acrylate is a particularly effective ester to employ in producing products according to the present invention.

With further reference to the esterifying agent with which the ester is formed, it may be mentioned that such agents may be either alkyl or aryl, may be either straight chain or branched chain, and may be either saturated or unsaturated. Esters formed with alkyl alcohols are particularly effective, such for example as the butyl ester, mentioned above, and also iso-butyl, lauryl and cetyl esters.

The solvent employed during chlorination is advantageously a chlorinated solvent, such as carbon tetrachloride, chloroform, etc., and the concentration of the solution prepared for chlorination is preferably relatively low, for example below about 35%, depending on the solubility characteristics of the particular polymer being chlorinated and also on the viscosity of the solution. It is of particular advantage to employ quite low concentrations, for instance, below about 15%, since the solution tends to become quite viscous toward the end of the chlorination and this makes bubbling of the chlorine gas through the solution quite difficult, unless the concentration is kept low. With this in mind, I prefer to use concentrations ranging from about 1% to about 15%. Acetic acid may also be used as solvent, in which case concentrations up to about 35% may be employed. Chlorination in acetic acid usually proceeds more slowly, in view of which more vigorous chlorination conditions are of advantage.

As chlorination proceeds the temperature of the solution tends to rise, and in most cases it is of advantage to apply some heat, since the rate of the chlorination reaction is thereby accelerated. Initiation of chlorination is promoted by pre-heating the solution before passing the chlorine therethrough, and I prefer to maintain a temperature of at least 60° C. throughout the period of chlorination. However, the temperature should be controlled so as not to cause excessive loss of solvent. Refluxing is also of advantage for this purpose.

Exposure of the solution to catalytic light materially accelerates the chlorination and for this purpose ordinary incandescent electric lamps placed close to the outside of a glass chlorination vessel will be found effective. The chlorination does not require the presence of catalytic light but may even be performed in a completely opaque reaction vessel, although in this case maintenance of the temperature close to the boiling point of the solvent is of advantage in order to promote the substitution of chlorine atoms for hydrogen in the molecule.

The combination of both high temperature (as specified above) and strong catalytic light is preferred and will yield products of surprisingly high chlorine content, even in a relatively short time, for instance, even up to about 75% combined chlorine, which corresponds to an increase in weight of the product as high as 300%.

In order to secure the type of product contemplated by the present invention, particularly the change in physical consistency referred to above, chlorination should be continued under the conditions above described until an average of at least two chlorine atoms are substituted for hydrogen in each radical of the polymer, i. e., in each radical enclosed in the brackets applied to the structural formula given above. With the shorter ester chain polymers of 2,000 initial molecular weight, two chlorine atoms per radical correspond to an increase in molecular weight somewhat greater than 1,000, thereby yielding a chlorinated product having a molecular weight of at least 3,000. In connection with the extent of chlorination, it is to be understood that chlorine atoms may be substituted for hydrogen at various places in the acrylate radical, not only in the chain of the polymer, but also in the ester group (R). The exact point or points of substitution will depend somewhat on the conditions and extent of chlorination, but this theoretical consideration need not be discussed in detail herein, although as already indicated, an average of at least two chlorine atoms per acrylate radical is of importance in securing the type of product contemplated by the invention. Most advantageously, three or more chlorine atoms are substituted for hydrogen in each radical. When employing polymeric butyl acrylate, as is preferred, the substitution of three chlorine atoms yields a product containing in the neighborhood of 46% combined chlorine, which represents almost a 100% increase in weight of the product. With butyl acrylate I have even been able to substitute chlorine atoms for as many as eight out of the twelve hydrogen atoms present in each radical of the polymer. With lauryl acrylate this figure is more than doubled.

Upon attaining the desired degree of chlorination, the solution of the chlorinated acrylate is then mixed with a substantial volume of a precipitant, i. e., a liquid in which the chlorinated product is substantially insoluble and in which the chlorination solvent is soluble. When a chlorinated solvent is used, various alcohols such as methyl alcohol, ethyl alcohol and also certain aliphatic hydrocarbons may be utilized for precipitation. When employing acetic acid as solvent it is not necessary to use precipitants such as alcohols, since even cold water will serve the purpose. It is of importance during this precipitation that the mixture be thoroughly and vigorously agitated in order to place the chlorinated product in such finely divided state that occlusion of any appreciable quantity of carbon tetrachloride or other chlorination solvent is prevented. In consequence the precipitate forms as a fine powder which can readily be dried and which retains free flowing powdery consistency. This is of great advantage in subsequent handling and use.

Other methods for separating the chlorinated material from the chlorination solvent may also be employed, provided such methods are conducted in a manner affording such extensive surface area exposure of the chlorinated product that occlusion of solvent within the particle is prevented. As illustrative of other methods of separation, reference is made to mixture of the solution of the chlorinated material in the chlorination solvent with boiling water, which will result in volatilization of the solvent (assuming the particular solvent selected has a boiling point below that of water or can be readily volatilized), the chlorinated acrylate polymer again being thrown out in a form which after cooling, washing and drying, constitutes a fine powder.

Still other methods of separation of the product from the solvent include spraying of the solution into a warmed chamber. Moreover, merely spreading the solution of the chlorinated product in the chlorination solvent in the form of a thin film, or extruding it in the form of a filament, will provide sufficient surface area exposure to enable effective and substantially complete elimination of solvent. Films and filaments made in this way manifest considerable toughness and are transparent and substantially colorless.

EXAMPLES

In each of the examples given below, somewhat more than the theoretical quantity of chlorine was passed during the chlorination. In all cases reflux was utilized in order to avoid extensive loss of solvent. The quantities of the acrylates treated in the several examples were of laboratory size, in view of which it will be understood that for large size commercial batches some differences in handling may be required, for instance, a longer time of chlorination may be needed.

Example 1

Polymeric butyl acrylate was dispersed in carbon tetrachloride to yield a concentration of about 1% of the acrylate in the solution. Chlorination was effected by placing the solution in a glass reaction vessel and bubbling chlorine gas therethrough for 2½ hours. Strong electric lights were placed adjacent to the reaction vessel to catalyze the reaction and the temperature was maintained at about 65° C. Upon completion of the chlorination the solution of the chlorinated acrylate in carbon tetrachloride was mixed with a somewhat larger volume of methyl alcohol and agitated. The chlorinated acrylate precipitated as a white powder. The product contained 68.2% combined chlorine.

Example 2

Polymeric iso-butyl acrylate was treated in the manner described above under Example 1, for a period of 3 hours, the chlorination being effected at a temperature of about 72° C. The product was precipitated in methyl alcohol and comprised a white powder having combined chlorine content of 65.8%.

Example 3

Polymeric cetyl acrylate was chlorinated in the general manner described above under Example 1, the acrylate, in this case, constituting 5% of the solution, instead of 1% as in Examples 1 and 2. Chlorination was continued for 3 hours at a temperature of about 70° C. and, upon precipitation in methyl alcohol the chlorinated product was secured as a white powder containing 62.5% combined chlorine. In this example, after 2 hours of chlorination, a sample was precipitated, this sample product also comprising a white powder precipitate having a chlorine content of 57.5%.

Example 4

Polymeric lauryl acrylate was chlorinated in the general manner described under Example 1, the acrylate in this case constituting 4% of the carbon tetrachloride solution. Chlorination was continued for about 3 hours at a temperature averaging about 75° C. After chlorination the solution of the chlorinated acrylate in carbon tetrachloride was divided into three portions which were separately precipitated, one portion in methyl alcohol, one in boiling water, and the third in mineral spirits. The products of all three precipitations constituted white powders, each having a chlorine content of 73.5%, and a softening point at 150° C.

Films made from toluene solutions of these products were glossy and of excellent resistance to water, alkali and fire.

Example 5

Polymeric benzyl acrylate was chlorinated according to the general method described above, except that chloroform was used as solvent instead of carbon tetrachloride, the benzyl acrylate constituting 10% of the dispersion. Chlorination was continued for about 6 hours at a temperature in the neighborhood of 62° C., after which the chlorinated acrylate in solution in the chloroform was precipitated in methyl alcohol, yielding a white powder precipitate having a chlorine content of 52%.

Example 6

Polymeric hydroabietyl acrylate was chlorinated in the general manner described above, except that the initial dispersion was prepared with acetic acid, the acrylate comprising 25% of the dispersion. After chlorination for 6 hours at a temperature averaging about 76° C., the product was precipitated from water. The precipitate constituted a white powder having a chlorine content of 39%.

Example 7

In this example polymeric hydroabietyl acrylate was chlorinated in carbon tetrachloride in the manner described above, the acrylate constituting 12.5% of the initial dispersion. Chlorination was continued for about 5½ hours at a temperature averaging about 70° C. The product was precipitated in methyl alcohol and constituted a white powder having a chlorine content of 49.7%.

It may be noted in connection with Examples 1 to 7 above, that the acrylic ester polymers employed were all prepared by alcoholysis of monomeric methyl acrylate, and subsequent emulsion polymerization, using hydrogen peroxide or benzoyl peroxide as a catalyst. The full details of the method of preparing the acrylic ester polymers need not be considered herein since preparation of the ester polymers forms no part of the present invention per se, but it may be noted that a detailed description of such a method appears in "Preparation and Properties of Normal Alkyl Acrylates," by C. E. Rehberg and C. H. Fisher, Journal of the American Chemical Society, 66, 1203 (1944).

Example 8

In this example polymeric hydroabietyl acrylate was chlorinated, the polymeric material, however, being prepared in a somewhat different way. Thus, after alcoholysis of monomeric methyl acrylate to secure the monomeric hydroabietyl acrylate, polymerization was effected merely by heating the monomeric material. Specifically, this was effected by subjecting the monomeric material to distillation, which yielded a distillate comprising substantially pure monomeric hydroabietyl acrylate (used in preparation of the polymeric material chlorinated in Example 7 above), and a still residue which, although not entirely pure, in large part comprised polymerized hydroabietyl acrylate.

This polymerized still residue was dispersed in carbon tetrachloride, the residue comprising about 33⅓% of the dispersion and the dispersion was then subjected to chlorination in the general manner described above. The chlorination was continued for about 2½ hours at a temperature averaging about 72° C. After chlorination the product was precipitated from methyl alcohol and constituted a pale yellow powder having a chlorine content of 30.4%.

From the above it will be noted that all of the products are white powders, which is in distinct contrast to the rubbery or waxy consistency of the same unchlorinated acrylates.

I claim:

1. A product comprising a chlorinated polymerized ester formed from acrylic acid and a straight chain monohydric alcohol higher than propyl, containing from 46% to 75% by weight of chlorine substituted for hydrogen in the molecule, said product comprising a frangible solid.

2. A product comprising a chlorinated polymerized butyl acrylate containing an average of at least three chlorine atoms substituted for hydrogen atoms in each unit of the polymeric molecule, said chlorinated product having a combined content of chlorine of from 46% to 75% by weight.

3. A product comprising a chlorinated polymerized cetyl acrylate containing an average of at least three chlorine atoms substituted for hydrogen atoms in each unit of the polymeric molecule, said chlorinated product having a combined content of chlorine of from 46% to 75% by weight.

VIGEN K. BABAYAN.

REFERENCES CITED

The following references are of record in the file of this patent:

UNITED STATES PATENTS

| Number | Name | Date |
| --- | --- | --- |
| 2,021,763 | Bauer | Nov. 19, 1935 |
| 2,337,681 | Pollack | Dec. 28, 1943 |

OTHER REFERENCES

Mark & Raff High Polymeric Reaction, vol. III (1941), Interscience Publishers, Inc., N. Y., pages 24 and 25.